R. B. EATON.
NUT LOCK.
APPLICATION FILED JULY 27, 1918.
1,313,589.  Patented Aug. 19, 1919.
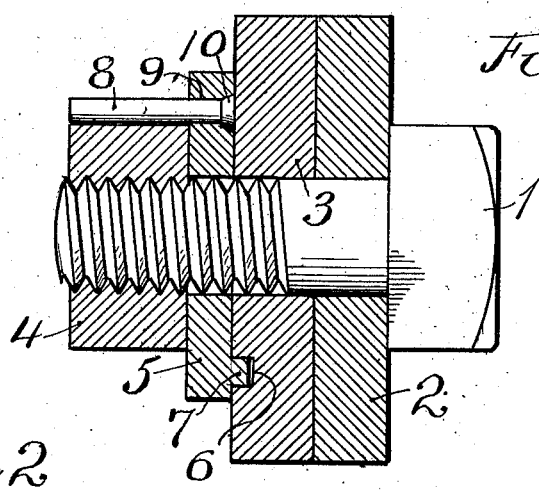
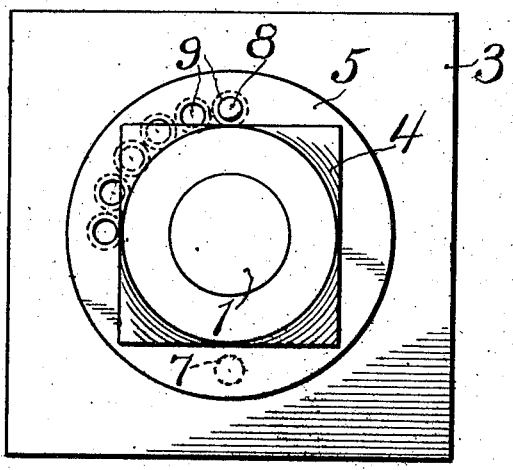
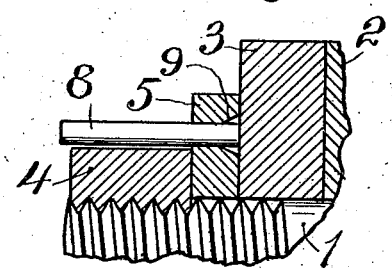
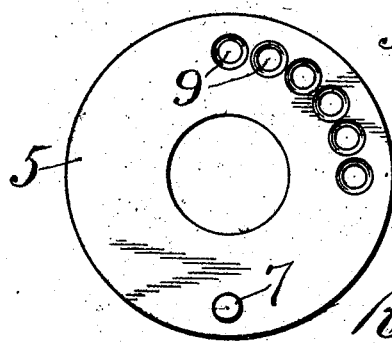
WITNESS:
INVENTOR.
Reason B. Eaton
BY Warren D. House,
His ATTORNEY

UNITED STATES PATENT OFFICE.

REASON B. EATON, OF OSWEGO, KANSAS, ASSIGNOR OF ONE-THIRD TO WILLIAM J. CARPENTER, OF KANSAS CITY, MISSOURI.

NUT-LOCK.

1,313,589.     Specification of Letters Patent.     Patented Aug. 19, 1919.

Application filed July 27, 1918. Serial No. 246,968.

*To all whom it may concern:*

Be it known that I, REASON B. EATON, a citizen of the United States, residing at Oswego, in the county of Labette and State of Kansas, have invented a certain new and useful Improvement in Nut-Locks, of which the following is a specification.

My invention relates to improvements in nut locks.

The object of my invention is to provide a nut lock which is simple in construction, which is cheap to manufacture, which is strong and durable and which permits the nut to be tightened to any position and when so tightened to be securely held in such position.

The novel features of my invention are hereinafter fully described and claimed.

In the accompanying drawing which illustrates the preferred embodiment of my invention, Figure 1 is a central longitudinal sectional view of my improved nut lock shown in operative position.

Fig. 2 is an end elevation of what is shown in Fig. 1.

Fig. 3 is a fragmental sectional view showing the parts in operative position prior to the inner end of the locking pin having been upset and expanded in the countersink of the hole in which it is fitted.

Fig. 4 is an inner view of the washer.

Similar reference characters designate similar parts in the different views.

1 designates an ordinary bolt which extends through two members or plates 2 and 3, which it is designed to clamp together.

4 designates an ordinary square nut mounted on the bolt and bearing against the outer side of a washer 5, the inner side of which bears against the member 3. The latter member has means for engaging the washer 5 to hold the washer from turning. Such means may comprise a hole 6 into which extends a projection 7 on the inner side of the washer 5.

To hold the nut 4 from turning on the bolt 1, I provide a malleable locking pin 8 adapted to be fitted in any one of a series of holes 9, which are disposed in an arcuate row, preferably, and which extend through the washer 5, the center of the arc being the longitudinal center of the bolt 1.

As shown in the drawing, the inner end of each hole 9 is countersunk, so that when the malleable locking pin is fitted in one of the holes 9 and hammered inwardly, the inner end of the locking pin will be upset and expanded to form a head 10 which may fill or partly fill the countersink of the hole in which the pin 8 is fitted.

Preferably, the locking pin 8 before being hammered, as described, projects outwardly beyond the nut 4, so as to be easily struck with a hammer, see Fig. 3. When the locking pin has been hammered sufficiently, it will be shortened, and the head 10, formed at its inner end and occupying the countersink of the hole in which the pin is fitted, will be larger than the portion of the hole at the outside of the counter sink, and will thus be securely held from slipping out of the hole, regardless of the jarring or vibration to which the nut lock may be subjected.

The holes 9 are so located that one of them will always be uncovered whatever may be the position of the nut 4. As shown in the drawing, the holes 9 are so located that the radius of the arc which touches the inner sides of the holes will be approximately the same as the radius of the smallest diameter of the nut 4. This will permit the locking pin when fitted in one of the holes to be close to the side of the nut, so that the latter can not unscrew to any substantial amount. It will also be noted that the row of holes 9 should extend at least a distance equal to the arc of which one side of the nut 4 is the chord. The holes 9 should, also be close together, so that at any position of the nut 4 one of the holes will be uncovered.

The countersunk portion of each hole is, preferably, concentric with the hole, so that hammering in of the pin will not tend to bend the pin laterally.

In the operation of my invention, the bolt 1 is passed through the plates 2 and 3, after which the washer 5 is slipped onto the bolt and against the member or plate 3, the projection 7 of the washer being fitted into the hole 6 of the member 3. The nut is then screwed onto the bolt so as to tightly clamp the washer 5 against the member 3, the nut being screwed perfectly tight.

The locking pin 8 is then fitted into a hole 9 which at the time is not covered by the nut, as shown in Fig. 3. In the drawing two holes are shown uncovered. The pin may be fitted into either of these two holes which are at the ends of the row, in the particular case illustrated.

The projecting outer end of the locking pin 8 is then hammered until the inner end of the pin is upset to form the head 10. The locking pin will now securely hold the nut 4 from turning, the pin being located in the path of the corners of the nut, and close to the adjacent side of the nut. The head will prevent the pin from being accidentally removed by vibration or otherwise, and the nut will remain fully tightened.

I do not limit my invention to the structure shown and described, as modifications, within the scope of the appended claim, may be made without departing from the spirit of my invention.

What I claim is:—

In a nut lock, the combination with a nut and bolt, of a washer having extending from the outer side to its inner side a transverse hole the inner end of which is countersunk, and a malleable locking pin in said hole and in the path of the corners of the nut and having its inner end upset and expanded in said countersink of the hole.

In testimony whereof I have signed my name to this specification.

REASON B. EATON.

Copies of this patent may be obtained for five cents each, by addressing the "Commissioner of Patents, Washington, D. C."